United States Patent Office 3,455,922
Patented July 15, 1969

3,455,922
BASIC PERINONE DYESTUFFS CONTAINING CONDENSED HETEROCYCLIC RING SYSTEM
Gert Hegar, Basel, Switzerland, assignor to Ciba Limited, Basel, Switzerland, a Swiss company
No Drawing. Filed Aug. 10, 1966, Ser. No. 571,390
Claims priority, application Switzerland, Aug. 23, 1965, 11,825/65
Int. Cl. C09b 57/00; D06p 1/42
U.S. Cl. 260—256.4       3 Claims

ABSTRACT OF THE DISCLOSURE

Basic perinone dyes of formula

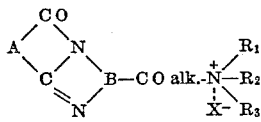

in which A and B each denotes an aryl residue condensed with the heterocyclic ring system in the ortho or peri position, "alk" denotes an alkylene group, $R_1$, $R_2$ and $R_3$ each denotes an alkyl or aralkyl residue which together with the nitrogen atom may also form a heterocyclic ring, especially a pyridine ring, and X denotes an anion, are suitable for coloring a wide variety of natural and synthetic fibers, particularly polyacrylonitrile or polyvinylidene cyanide to provide dyeings of outstanding light fastness.

---

This invention is based on the observation that valuable basic perinone dyes of formula (1)
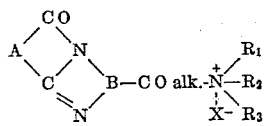

in which A and B each denotes an aryl residue condensed with the heterocyclic ring system in the ortho or peri position, "alk" denotes an alkylene group, $R_1$, $R_2$ and $R_3$ each denotes an alkyl or aralkyl residue which together with the nitrogen atom may also form a heterocyclic ring, especially a pyridine ring, and X denotes an anion, may be obtained by reacting a halogenacylperinone of formula (2)
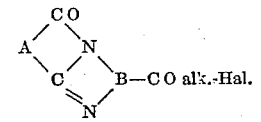

with a tertiary amine of formula

The halogenacylperinones of Formula 2 to be used as the starting materials preferably contain benzene or naphthalene residues as the aryl residues which may be further substituted by halogen atoms or by nitro, alkyl or alkoxy groups. Of special interest are compounds of formula

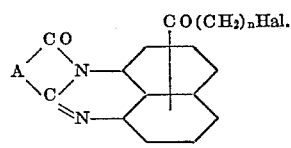

in which A denotes a benzene or naphthalene residue and $n$ is 1 or 2. These compounds may be obtained by condensing the corresponding perinone with an α- or β-halogeno-fatty acid halide in the presence of aluminum chloride by the Friedel-Crafts reaction. The perinones in turn may be obtained by condensing the anhydride of a benzene-1,2-dicarboxylic acid, for example phthalic acid, 4-chlorophthalic acid, 3,4- or 4,5-dichlorophthalic acid, tetrachlorophthalic acid or 4-nitrophthalic acid or the anhydride of a naphthalene-1,8-dicarboxylic acid, for example of 1,8-naphthalic acid, tetrachloro-1,8-naphthalic acid, 4-chloro- or 4-bromo-1,8-naphthalic acid, 4,5-dichloro-1,8-naphthalic acid, 4-nitro-1,8-naphthalic acid or acenaphthalic acid of formula

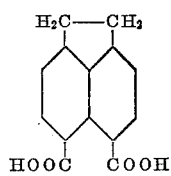

The reaction of the halogenacylperinones of Formula 2 with the tertiary amines is advantageously carried out by warming with an excess of the amine or with the theoretical amount of the amine, for example trimethylamine, triethylamine, dimethylbenzylamine or pyridine in the presence of an inert solvent, for example benzene, chlorobenzene, nitrobenzene, dioxane, dimethylformamide, dimethylsulphoxide or N-methylpyrrolidone.

The dyestuff salts are advantageously purified by dissolving them in water and filtering any unreacted starting dyestuff as an insoluble residue. The dyestuff is again precipitated from the aqueous solution by adding water soluble salts, for example sodium chloride.

The dyestuffs obtained according to the invention preferably contain as the anion the residue of a strong acid, for example of sulphuric acid or its half-esters, or of an arylsulphonic acid or a halogen ion. The anions referred to, which are introduced into the dyestuff molecule in accordance with the invention, may also be replaced by anions of other inorganic acids, for example of phosphoric acid, sulphuric acid, or of organic acids for example formic, acetic, chloracetic, oxalic, lactic or tartaric acid; in certain cases the free bases may also be used. The dyestuff salts may also be used in the form of double salts, for example with halides of Group II of the Periodic Table, especially zinc chloride or cadmium chloride.

The dyestuff salts obtained in accordance with the invention are suitable for dyeing and printing a wide variety of materials, for example tanned cellulose fibres, silk, hair, leather or synthetic fibres, especially polyacrylonitrile or polyvinylidene cyanide. The dyeings obtained on these fibres are distinguished by outstanding light fastness.

In the examples which follow the parts and percentages, unless otherwise stated, are by weight, and the temperatures are given in degrees centigrade.

Example 1

27 parts of phthaloperinone, prepared in known manner by fusing together 14.8 parts of phthalic anhydride and 15.8 parts of 1,8-naphthylene diamine are worked into a sludge with 150 parts by volume of carbon disulphide. To this are added 15 parts of chloracetyl chloride and 35 parts of powdered aluminum chloride and the mixture is stirred for 10–15 hours at room temperature. The carbon disulphide is then decanted and the residue decomposed by adding ice. The chloracetyl compound which separates out is filtered and dried.

17.4 parts of the chloracetylated phthaloperinone and 100 parts by volume of pyridine are stirred for 1 hour at 100°. After cooling the crystalline pyridinium salt of the formula

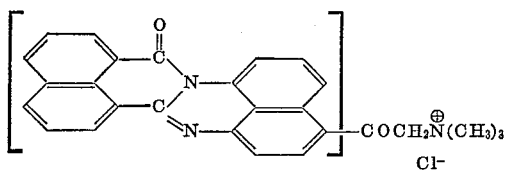

is filtered, washed with benzene and dried. The dyestuff gives an orange shade on polyacrylonitrile fibres fast to light.

Example 2

20 parts of the naphthaloperinone obtained by fusing together 1,8-naphthalic anhydride and 1,8-naphthylene diamine are chloracetylated as described in paragraph 1 of Example 1, and 20 parts of the resulting chloracetylnaphthaloperinone are stirred with 28 parts by volume of a 25% aqueous trimethylamine solution in 100 parts by volume of dimethylformamide for 2 hours at 30–40°. The mixture is then diluted with 1,000 parts of water, adjusted to a pH value of 5 by means of acetic acid, and the dyestuff salt of formula

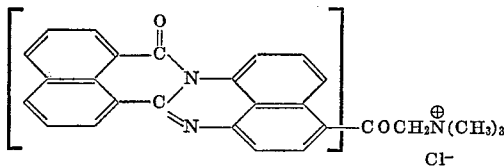

is precipitated by adding saturated brine. The dyestuff dyes polyacrylonitrile fibres red shades of good fastness to light.

Example 3

1 part of the dyestuff obtained in accordance with Example 1 is dissolved in 5,000 parts of water with the addition of 2 parts of 40% acetic acid. 100 parts of yarn made of polyacrylonitrile staple fibres are introduced into this dyebath at 60°, the temperature is raised to 100° during ½ an hour, and dyeing is carried out for 1 hour at the boil. The material is then thoroughly rinsed and dried. An orange dyeing having very good fastness to light, sublimation and washing is obtained.

What is claimed is:
1. A compound of the formula

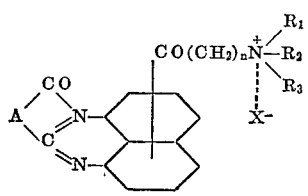

in which A represents a member selected from an unsubstituted, halogenated or nitrated o-phenylene or perinaphthalene radicals, $n$ is a whole positive number up to and including 2, $R_1$, $R_2$, $R_3$ each represents a lower alkyl or a benzyl group or together with the nitrogen form a pyridine ring and X is an anion.

2. The dyestuff claimed in claim 1 which corresponds to the formula

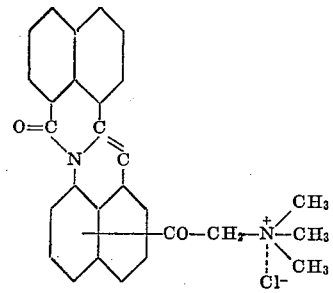

3. The dyestuff claimed in claim 1 which corresponds to the formula

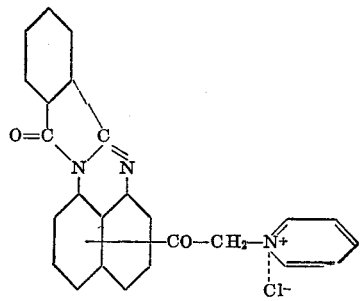

References Cited

UNITED STATES PATENTS 2,884,422  4/1959  Slinger et al. _____ 260—256.4
2,884,423  4/1959  Wilkinson _____ 260—256.4

FOREIGN PATENTS 938,730  2/1956  Germany.

ALEX MAZEL, Primary Examiner
R. J. GALLAGHER, Assistant Examiner

U.S. Cl. X.R.

8—54, 54.2; 260—41, 309.2